United States Patent [19]

Amstutz et al.

[11] Patent Number: 4,536,322

[45] Date of Patent: Aug. 20, 1985

[54] FLUORESCENT CORROSIVE FLUORIDE SOLUTION

[75] Inventors: Gary A. Amstutz; Kishor D. Mayekar, both of San Jose, Calif.

[73] Assignee: Union Carbide Corporation, Danbury, Conn.

[21] Appl. No.: 546,543

[22] Filed: Oct. 28, 1983

[51] Int. Cl.$^3$ .............................................. C09K 11/06
[52] U.S. Cl. .............................. 252/301.16; 250/461.1; 250/484.1; 252/79.3; 252/301.19; 423/470; 423/483
[58] Field of Search ...................... 252/301.16, 301.19, 252/301.21, 301.22–301.35, 79.3; 423/483, 470; 250/461.1, 484.1

[56] References Cited

U.S. PATENT DOCUMENTS

| Re. 26,888 | 5/1970 | Alburger | 252/301.2 |
| 3,257,167 | 6/1966 | Mohr et al. | 23/153 |
| 3,773,464 | 11/1973 | Streck | 8/93 |
| 3,960,559 | 6/1976 | Suzuki et al. | 252/79.3 |
| 4,375,384 | 3/1983 | Molina | 156/626 |
| 4,410,396 | 10/1983 | Somers et al. | 252/79.3 |

FOREIGN PATENT DOCUMENTS 527682 9/1975 Japan ................................. 252/79.3

Primary Examiner—Arthur P. Demers
Attorney, Agent, or Firm—Fredrick J. McCarthy, Jr.

[57] ABSTRACT

A composition of matter including an aqueous solution of hydrofluoric acid or ammonium fluoride and a dye that fluoresces when illuminated by ultra-violet light. Spilled corrosive fluoride solutions are thereby rendered easily detectable by subjecting the surface onto which the solution was spilled to ultra-violet radiation.

14 Claims, No Drawings

FLUORESCENT CORROSIVE FLUORIDE SOLUTION

BACKGROUND OF THE INVENTION

1. Field of the Invention

This invention relates to compositions of matter containing dyes that are not visible to the naked eye when in solution but which fluoresce when illuminated by ultra-violet light, thereby making them visible. In particular, this invention relates to compositions of matter containing aqueous corrosive fluoride solutions and a dye that fluoresces in the visible region when illuminated by ultra-violet light.

2. Description of the Prior Art

Aqueous etchant solutions of a type regularly used in semiconductor manufacture to etch wafers, e.g., silicon wafers, contain up to fifty percent by weight of corrosive fluoride compounds, particularly hydrofluoric acid (HF) and/or ammonium fluoride ($NH_4F$). A "corrosive fluoride" compound is defined herein as a fluoride compound that adversely affects human skin after contact. These compounds, particularly hydrofluoric acid, are not readily detected if accidentally gotten on the skin, work surfaces or clothing and once on the skin, can cause very painful burns several hours later. Prompt injection of calcium compounds is necessary to counteract the fluoride ion and avoid injury. An easy and rapid way of detecting corrosive fluoride solutions on work surfaces, clothing or human skin is therefore highly desirable.

There have been ways suggested in the past of making various compounds visible by dying them. One example is U.S. Pat. No. 3,737,349, issued June 5, 1973, to Michael K. Levenson. This disclosure teaches the use of a fluorescing compound in an explosive composition, which may leak or be extruded from its casing. The fluorescent compound provides a way of detecting the particular leaking explosive casing.

U.S. Pat. No. 2,325,421, issued July 27, 1943, to Allen L. Omohundro, et al., teaches the identification of white mineral oils by adding very small amounts of carotene compounds.

U.S. Pat. No. 2,267,758, issued Dec. 30, 1941 to Francio M. Sell shows a variety of dyes that can be used to invisibly mark textiles. The dyes are made visible under ultra-violet illumination.

U.S. Pat. No. 4,231,750, issued Nov. 4, 1980 to Robert M. Dawben, et al., shows a method of fluoroimmunioassay. A fluorescently labeled low molecular weight antigen is used to assay small amounts of enzymes.

SUMMARY OF THE PRESENT INVENTION

The object of this invention is to provide an aqueous solution of corrosive fluoride and dye that is suitable as an etchant in the manufacture of semiconductor devices and which can readily and rapidly be detected if spilled on work surfaces or human skin.

Another object of this invention is to provide such conveniently detected solutions while not interfering with the desired use of the solutions as etchants.

Another object of this invention is to provide such conveniently detected solutions which are detectable by low intensity ultraviolet radiation under typical silicon wafer fabrication "safe light" conditions, e.g., amber or yellow light which is maintained in the work areas.

It would be advantageous to have a composition of corrosive fluoride compounds that contains a non-metallic, colorless organic dye that fluoresces in the visible region when illuminated by ultra-violet light while not changing the etching properties of the solution, e.g., etch rate, purity, rinsability, physical and chemical stability.

This invention discloses a composition of matter comprising an aqueous solution of a corrosive fluoride component, and a small amount of a normally colorless dye that fluoresces in the visible region when illuminated by ultra-violet light.

DETAILED DESCRIPTION OF THE PREFERRED EMBODIMENTS

Aqueous etchant solutions used in semi-conductor manufacture to etch wafers under "safe light" conditions often contain up to fifty percent by weight in the aggregate of corrosive fluoride component, hydrofluoric acid and/or ammonium fluoride, e.g., from 0.5 to 50 percent by weight, and sometimes amounts up to 45 percent by weight in the aggregate, of acetic acid and/or nitric acid and other additives such as ethylene glycol, and surfactants, e.g., up to 25 percent by weight. The solutions employed are clear and colorless and not readily detected if gotten on the skin or work surfaces. Visible dyes cannot be effectively used to make these solutions detectable since the strength of these aqueous etchant solutions is commonly determined by titrations using visible organic dyes that indicate neutrality by color change and this technique would be affected by the use of an additional visible dye. A dye that is normally invisible in an aqueous solutions but which in small amounts can be made to detectably fluoresce with low intensity ultra-violet light under "safe light" conditions without adversely affecting etchant properties would be ideal.

For easy optical detection of corrosive fluorides used in semiconductor manufacturing, the dye should fluoresce at wavelengths other than the wavelength of wafer fabrication "safe light" conditions, which is usually an amber or yellow light. That is, the fluorescing must be visible under wafer fabrication "safe light" conditions.

Dyes having the following general formula are preferred for the practice of the present invention:

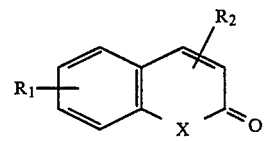

whose
$R_1 = NH_2$ or $OH$
$R_2 = C_1–C_{18}$ alkyl or halogen substituted methyl
$X = O$ or $N$.

The dye employed in accordance with the present invention must be an organic dye, since metal base dyes would be unacceptable in an etchant used for semiconductor manufacturing. The etchants used in semiconductor manufacture must be high purity materials with extremely low metal concentrations, e.g., having metal concentrations not more than one part per million. The organic dyes themselves thus must contain similar low levels of metal impurities; hence, phosphors such as zinc sulfate are not usable. The dyes must also be soluble in aqueous etchant solutions containing hydrogen fluoride, ammonium fluoride and which may also contain acetic acid, nitric acid, and other additives such as aluminum acetate, ethylene glycol, or surfactants, and must be capable of being rinsed from patterned silicon wafers without leaving a residue. Also, the etch rate of the etchant must not be significantly affected by the dye and the dye should not react with the etchant or be decomposed by the etchant.

Various dyes as listed below were selected and dissolved in aqueous solutions of HF, HF and $NH_4F$, and $NH_4F$ and acetic acid and were successfully tested for solubility, fluorescence (visibility), effect on etch rate, decomposition and purity.

(1) 7-Hydroxy-4-methyl coumarin;
(2) 7-Amino-4-methyl coumarin;
(3) 7-Amino-4-trifluoromethyl coumarin;
(4) 7-Amino-4-methyl-2-quinolinol;
(5) 2,6-Diaminopyridine;
(6) 2-(2-Pyridyl)benzimidazole;
(7) 8-Hydroxyquinoline;
(8) Trans-o-coumaric acid; and
(9) 7-Methoxycoumarin-4-acetic acid.

The above dyes exhibit fluorescence to the naked eye when illuminated by ultra-violet radiation of between 250 and 370 nanometers, particularly at 254 nanometers and 366 nanometers, two wavelengths found in a variety of portable and hand held low intensity "black light" ultra-violet sources such as Ultra-Violet Products unit UGVL-25 described at p. 565 of Fisher Scientific Company 1983 catalogue. This unit has an intensity of 180 $\mu w/cm^2$ at a distance of 15 cm (254 nm); 260 $\mu w/cm^2$ at a distance of 15 cm (366 nm).

It is preferred that the aqueous etchant solution contain the minimum amount of dye that is visibly fluorescent to the naked eye and in the present invention the preferred concentration is in the range of between 0.5 and 50 milligrams per liter and more preferably in the range of between 1 and 10 milligrams per liter. Dyes 1–4 above gave the brightest fluorescence (to the naked eye) when irradiated at 254 nm and 366 nm. Dye concentrations tested ranged from 5 mg/L to 25 mg/L. Dyes 1–4 are readily visibly fluorescent at 5 mg/L concentration. At a high concentration (22 mg/L), no change in etch rate was observed with these dyes added to two separate commercial buffered oxide etchants ($NH_4F$:HF solutions) known to be most sensitive to minor formulation changes or impurities. One of these commercial etchants contained 33.6 percent by weight $NH_4F$ and 7.8 percent by weight HF; the other commercial etchant contained 39 percent by weight $NH_4F$ and 1.2 percent by weight HF. Mixtures of the dyes in these etchants were heated to 60° C. and cooled with no apparent loss of fluorescent intensity in the mixture. The dyed etchant mixtures also show no loss of fluorescence after six months storage at 24° C.

EXAMPLE

A series of etchant solutions containing 33.6 percent by weight $NH_4F$ and 7.8 percent by weight HF was made to test dyes in accordance with the present invention and the properties of the aqueous solutions containing the dyes.

The concentration of the dyes tested ranged from 5 milligrams to 25 milligrams per liter of corrosive fluoride solution. It was found that solutions containing 7-Hydroxy-4-methyl coumarin, 7-Amino-4-methyl coumarin, 7-Amino-4-trifluoromethyl coumarin, or 7-Amino-4-methyl 2-quinolinol were readily detectable to the naked eye when irradiated with low intensity ultra violet radiation using the commercial unit noted hereinabove when the dye concentration was as low as 5 milligrams per liter.

Further tests were performed to determine if the presence of the dye in the two commercial etchant solutions noted above affected the rate of etching. Etch solutions were tested, both with and without dyes. The dye concentration was 22 milligrams per liter. No difference in the etching rate was observed.

What is claimed is:

1. An aqueous etchant solution comprising: a corrosive fluoride etchant component and a non-metallic, organic, normally colorless dye that fluoresces in the visible region when illuminated by ultra-violet light and which is non-reactive with the corrosive fluoride etchant component said dye being an organic dye having the general formula:

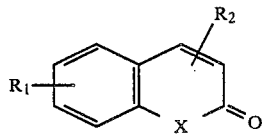

whose
$R_1 = NH_2$ or OH
$R_2 = C_1-C_{18}$ alkyl or fluorosubstituted methyl
$X = O$ or N.

2. The solution of claim 1 wherein said corrosive fluoride components are selected from the group consisting of hydrogen fluoride and ammonium fluoride.

3. The aqueous solution of claim 1 wherein said dye fluoresces at a wavelength visible in wafer fabrication "safe light" conditions.

4. The solution of claim 1 wherein said dye fluoresces when radiated with ultra-violet light having a wavelength in the range of from between about 250 nanometers to about 370 nanometers.

5. The solution of claim 1 wherein the dyes are present in concentrations in the range of between 0.5 and 50 milligrams per liter.

6. The solution in claim 1 wherein the dyes are present in concentrations of between 1 and 10 milligrams per liter.

7. The solution of claim 1 including a component selected from acetic acid and nitric acid.

8. The aqueous solution of claim 1 wherein said dye is 7-Hydroxy-4-methyl coumarin.

9. The aqueous solution of claim 1 wherein said dye is 7-Amino-4-methyl coumarin.

10. The aqueous solution of claim 1 wherein said dye is 7-Amino-4-trifluoromethyl coumarin.

11. The aqueous solution of claim 1 wherein said dye is 2,6-Diaminopyridine.

12. The aqueous solution of claim 1 wherein said dye is 2-(2-Pyridyl)benzimidazole.

13. The aqueous solution of claim 1 wherein said dye is Trans-o-coumaric acid.

14. The aqueous solution of claim 1 wherein said dye is 7-Methoxycoumarin-4-acetic acid.

* * * * *